Sept. 1, 1931.  C. F. NARDIN  1,821,396

FUEL VALVE

Filed Oct. 31, 1927  3 Sheets-Sheet 1

INVENTOR
*Celestin F. Nardin,*
BY
*Ray Belmont Whitman*
ATTORNEY

Sept. 1, 1931.  C. F. NARDIN  1,821,396
FUEL VALVE
Filed Oct. 31, 1927   3 Sheets-Sheet 2
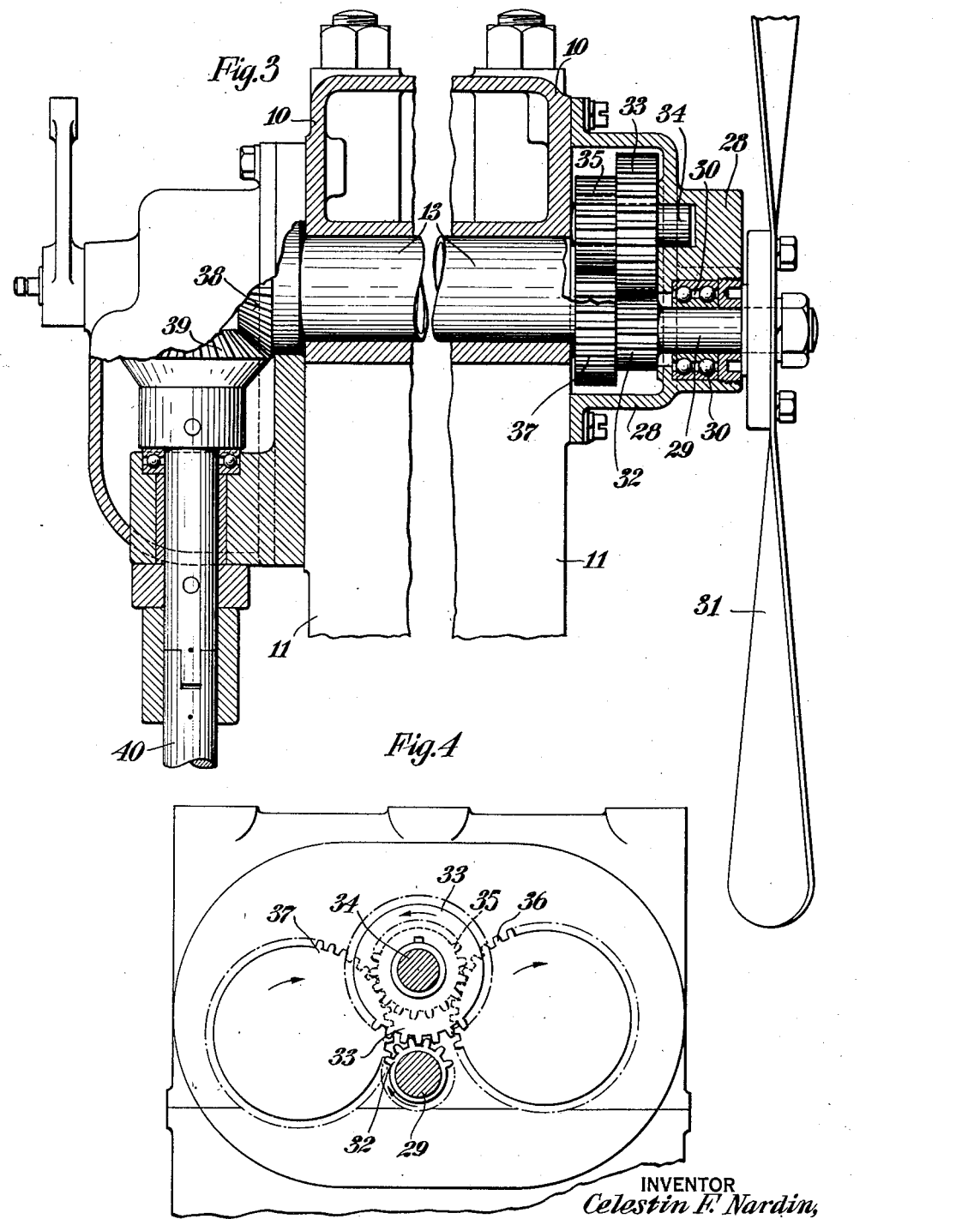
INVENTOR
Celestin F. Nardin,
BY
Ray Belmont Whitman
ATTORNEY Sept. 1, 1931.     C. F. NARDIN     1,821,396
FUEL VALVE
Filed Oct. 31, 1927     3 Sheets-Sheet 3

INVENTOR
Celestin F. Nardin,
BY
ATTORNEY

Patented Sept. 1, 1931

1,821,396

UNITED STATES PATENT OFFICE

CELESTIN F. NARDIN, OF BROOKLYN, NEW YORK

FUEL VALVE

Application filed October 31, 1927. Serial No. 229,944.

This invention relates to fuel valves, and more especially to a valve of the rotary type, for use in the cylinder head of a semi-Diesel low-grade fuel-oil engine, adapted for use particularly, in automobiles and aeroplanes. The invention also includes a novel driving means for said valve, and which is associated with the cooling fan of the engine. The invention comprises, too, means for compressing and delivering air to the cylinders in proper timed relation with their pistons, and which means is adapted to scavenge the burned gases from the cylinder after each explosion, and to admit a super-charge of compressed air for the succeeding power stroke.

These and other objects are described or suggested herebelow, and are illustrated in the accompanying drawings, in which—

Figure 1:
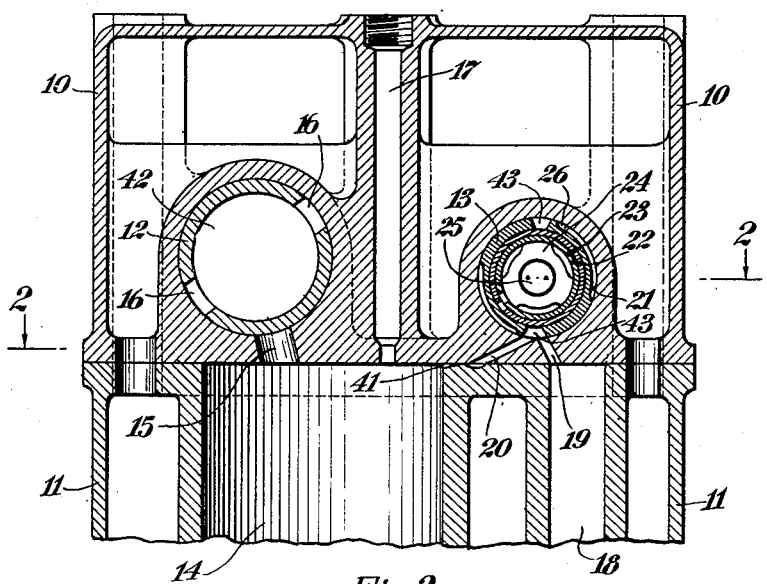
Figure 2:
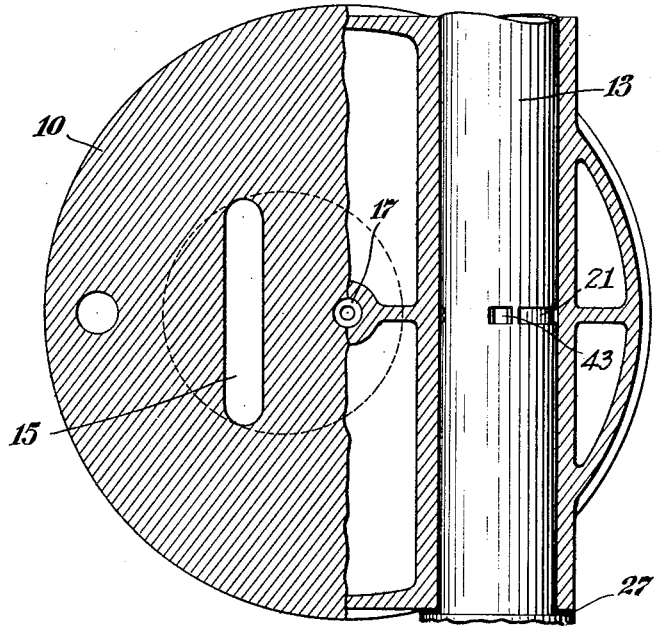
Figure 5:
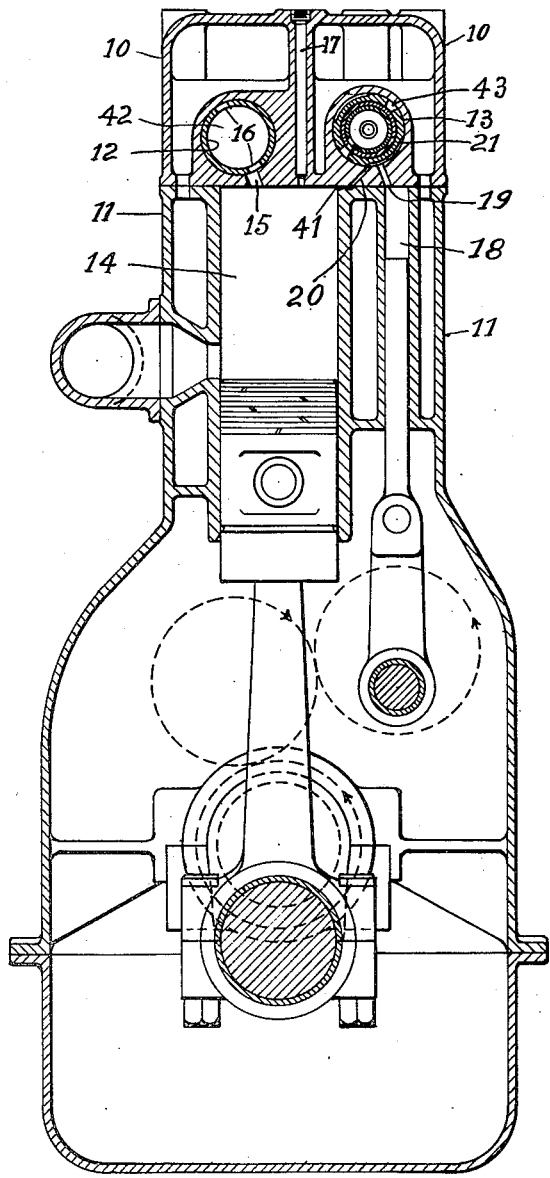
Figure 6:
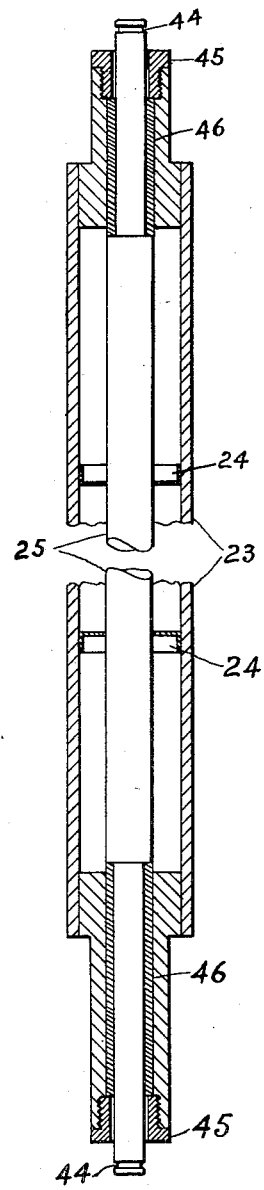

Figure 1 is a cross-sectional view of one of the cylinders of the motor, taken through a vertical diametral plane; Fig. 2, a horizontal sectional view through the planes 2—2 of Fig. 1; Fig. 3, a phantom elevational view of the front and rear ends of the complete motor, showing the drive of the fan and gears in front, and the driving shaft and connections at the rear of the motor; Fig. 4 is an elevational incomplete view from the front of the motor, showing the gear connections for driving the fan and the fuel and air valves; Fig. 5 is a sectional view of the engine similar to Fig. 1, but showing full details including both pistons in their cylinders and the exhaust openings in the main cylinder; and Fig. 6 is a longitudinal sectional view of the fuel valve showing the electric means for heating the fuel charge.

Like numerals refer to like parts throughout the several views.

There is shown a cylinder head 10, Fig. 1, detachably secured to the main cylinder block 11, as by means of a series of bolts in the usual manner. Projecting longitudinally through all cylinders, is a common rotatable air valve member 12, Fig. 1, and paralleling it but in back, a corresponding common rotatable fuel valve member 13, Figs. 1 and 2. Suitably positioned in the cylinder head 10, immediately above each cylinder 14, is an air port 15, extending across the top of the cylinder head laterally, and shaped as shown in Fig. 2.

There are the usual water-cooling jackets around the various operating parts of the motor, as illustrated.

Rotatable air valve 12 contains two oppositely-disposed openings or ports 16, substantially coinciding in dimensions with the air port 15 in the cylinder head, and being adapted to rotate out of position to close the connection from the compressed air-distributing line into the cylinder 14, as shown in Fig. 1. But a further rotation of the air valve member 12, will eventually bring one of these air ports into alignment with the cylinder head air port 15, permitting the charge of compressed air to escape into the cylinder. This rotary valve 12, is positively geared and timed to run at half crank shaft speed, so that in a two-cycle motor, each of the two ports of this valve, will, in its initial movement, permit the escape of a charge of compressed air, to scavenge, or force out the burned gases from the cylinder. The exhaust port then closes, and the air port being still partly open, lets in a super-charge of fresh air to be mixed with the fuel charge for the next stroke. The arrangement for gearing this valve 12 is explained below Projecting down through the axis of the cylinder head, is an opening 17, connecting with the cylinder 14, as shown in Fig. 1, and adapted for use with an indicator for testing the motor. This may also be used as a relief valve. There is a threaded section at the top for connecting the indicator, or plugging the opening when not in use.

Adjacent the power cylinder 14, is a chamber 18, in which reciprocates an injector plunger. Connecting chamber 18 with the fuel valve member is an inert gas duct 19, comprising a cylindrical hole arranged as shown in Fig. 1. Near the upper opening of this duct 19, and connecting with the fuel valve member 13, is a combined inert gas and fuel duct 20, leading downwardly and into the cylinder 14, at its upper edge.

The fuel valve member 13 contains cutout portion 21, shown in cross-section in Fig. 1, and in plan view in Fig. 2. This rotary valve is used for timing the fuel injection. It is made to rotate continuously in time with both the power and injector pistons, being geared in conjunction with the air valve 12, in manner as later described.

Positioned within the rotary fuel valve portion 13, is a stationary metering valve 22, having a port through which the fuel charge is metered.

Positioned concentrically within the stationary metering valve 22, is a rotary hand-operated valve or throttle 23, Fig. 1, with a suitable opening or port, adapted to be varied in area through operating the valve from a remote point, such as the dashboard of an automobile, to vary the amount of the charge of gas admitted to the cylinder, and hence to control the power or speed of the motor.

Projecting through a center hole of the centering washers 24, which are positioned within valve 23, is an electric fuel heater 25, consisting essentially of a resistance coil through which electrical current passes to pre-heat the charge of fuel before its admission to the cylinder. The fuel valve 13 has one or more air intake ports 21 for supplying a pre-determined amount of air to the fuel injector cylinder 18.

The continuous valve member 13, Fig. 2, has a packing gland or washer 27, where it enters and leaves both cylinder-head walls, to prevent the escape of the gases.

Bolted to the front of the forwardmost cylinder, is a gear-housing 28, Fig. 3, containing a fan shaft 29, rotatable in a bearing 30. To the outer end of this shaft 29, is secured a cooling fan 31 of the usual type, and to the inner end there is keyed a fan gear or pinion 32, which drives the fan 31. Pinion 32 is in turn driven by a spur gear 33 mounted on a shaft 34, to which is also geared another spur gear 35, which serves as an intermediate idler gear. Intermediate gear 35 meshes with the air valve gear 36, and also with the fuel valve gear 37, Fig. 4.

Gear 37 is keyed to the common rotatable fuel valve member 13 which rotates it; and gear 36 is keyed to the common rotatable air valve member 12, which it rotates.

The fuel valve member 13, Fig. 3, is driven through bevel gears, 38 and 39, from the driving shaft 40, which in turn is driven from the compressor shaft of the motor.

Fig. 5 shows both pistons at their lowest position with the valves in their proper timing. Slot 21 on valve 13 provides a free passage for the inert gases from cylinder 14 to cylinder 18 through ports 19, 20, and injection slot 41, but with communication ready to be closed by a further motion of valve 13. In this position the metering of the next fuel charge is shown very clearly, also the partial closure of the air valve 12.

In Fig. 6, there is shown the inner or fuel valve 23, spacing washers 24, while 25 represents a commercial type of heating coil, and 44—44 are metal connections to an outside source of electricity. The ends of the valve are closed by nuts 45, which hold the heating element with the aid of insulating bushings 46.

The operation of the device will now be described.

The fuel is supplied by a rotary gear pump, of the usual form, and is kept at a constant pressure in the throttle valve 23, which can be moved in its direction of rotation to entrap the fuel and prevent its escape. This movement of the throttle valve 23 in the stationary metering valve 22, meters the fuel to be injected into the power cylinder. This metering is accomplished by bringing the openings in the throttle valve and stationary valve more or less in alignment with each other.

The fuel valve 13, which is continuously rotating by means of the gear drive, as previously explained, and at half speed with the crank shaft, carries, besides its two airports 21, two fuel ports, or holes, 43, of the proper size to contain the maximum amount of fuel needed for injection. These ports are also placed 180° from each other, in order to give the fuel to the engine at the proper time.

The fuel, so metered, is carried around the stationary metering valve, 22, and in time is deposited in the inert gas and fuel duct 20, when one of the fuel valve ports 43 has rotated until it is in conjunction with said duct.

A further rotation of fuel valve port 43 will bring it in alignment with the compressed inert gas duct 19, to which compressed inert gas is supplied from the fuel injector cylinder 18; and said compressed inert gas will be injected into the fuel and vaporize it in the air-and-fuel duct 20, from which it passes to the power cylinder 14 through the spraying slot 41.

After this has taken place, a further motion of valve 13 will close all passages to the inert gas and fuel inlet at the time of explosion of the engine, and so seal the cylinder from above.

When the power piston in each cylinder 14 is driven downwardly at the power stroke by the expansion of the ignited gases, the injector plunger operating in cylinder 18 is also driven downwardly, the two being connected by suitable gearing and driven from the crank shaft.

The downward stroke of the injector plunger creates a vacuum in chamber 18. The rotation of valve 13 brings the main power cylinder 14 into communication with injector cylinder 18, through the air and fuel duct 20. The inert gas duct 19 by the aid of the air intake slot 21, as shown in Fig. 5, charges cylinder 18 with the mixture of inert gas and fuel, for the fuel injector, thus permitting the burned gases to be utilized to force the fresh fuel charge into the compressed air which has been charged into the power cylinder through port 15. The amount of compression of the burned gases, being designed to be substantially twice the pressure of the compressed air in the power cylinder, permits the fuel charge to quickly enter said cylinder.

The air valve is used both for supercharging and for scavenging the power cylinder of its burned gases, since its ports 16 permit an opening through air port 15 over a longer period than the exhaust port of the cylinder is open. During the first part of this period, the compressed air drives out the burned gases through the open exhaust port, which then closes before the air port 15 is closed.

The air valve 12, Fig. 1, is positively driven and timed with the crank shaft, and the fuel valve, and rotates also at half the crank shaft's speed, the gear connections being as shown in Figs. 3 and 4, as stated. The air, previously compressed, is delivered under such proper pressure by the rotary supercharger, and is stored in the hollow 42 of the valve 12. At the proper time this compressed air is delivered to the power cylinder from the top through the air port 15, thus cleaning it of all dead or burned gases. The air valve port, being designed to be left open for an appreciable time interval after the exhaust ports of the engine are closed, by the upstroke of the piston, gives to the power cylinder a super-charge of fresh air to be used in the next power stroke.

While two ports, 16, spaced 180°, are shown in the air valve 12, any other number of ports can be used, the speed of rotation of valve 12 being altered to suit. This applies also to the ports of the fuel valve 13.

It is to be understood that the present disclosure is for the purpose of illustration only, and that the invention is not limited thereto. To those skilled in the art, many modifications of the invention will be readily apparent, and it will also be obvious to such skilled persons that part of the device may be used without other parts thereof, many such combinations of the parts readily suggesting themselves. Therefore, it should be, and is to be distinctly understood that for a definition of the limitations of the invention, reference must be had to the appended claims.

Having now described the invention what is claimed as new and for which Letters Patent of the United States, is desired is:

1. The combination in an internal combustion engine of a storage metering rotary and throttle fuel valve, a rotary air valve, and means for supplying compressed burned gases with the fuel from the fuel valve to each power cylinder, and compressed fresh air from the air valve to each cylinder, for scavenging the cylinders of burnt gases and supercharging the cylinders with pure air.

2. In combination, a plurality of concentrically-arranged rotary valves, one for supplying fuel to the power cylinder of an internal combustion engine, one for metering the amount of fuel, and one for throttling the fuel from a remote point to vary the power of the motor.

3. The invention as in claim 2, the throttle valve surrounding an electric fuel heating means.

4. In combination, a power cylinder, a compressed air duct, and means for metering and admitting a charge of fuel mixed with compressed burnt gases, to the power cylinder at the proper time, said means including a plurality of concentrically-disposed rotary and hand operated fuel valves.

5. In combination, means for supplying compressed air to an oil engine cylinder to scavenge it of its burnt gases and thereafter to fill it with a supercharge of fresh air, and means for forcing into the supercharged cylinder a charge of preheated fuel, said last-named means being adapted to use burned gases of combustion under a pressure in excess of that of the supercharged air in the cylinder.

6. The method of admitting air and fuel to a plurality of oil engine cylinders in proper timed relation with the engine cycle said cylinders containing compressed pure air charged through a separate valve, including supplying inert gases and fuel under pressure to the port openings of a common rotary valve member extending through all cylinder heads, and revolving said common valve member to bring the various charges of inert gases and fuel into the various cylinders at the proper time in the cycle.

7. In a fuel valve for prime movers, two fuel ports therein, each containing sufficient capacity for holding the maximum amount of fuel needed for injection, said ports being placed diametrically opposite each other, including means for metering the fuel and depositing it in a combined inert gas and fuel duct from which it is conveyed to the cylinder by the inert gas pressure.

Signed at New York, in the county of New York and State of New York, this 27th day of October, A. D. 1927.

CELESTIN F. NARDIN.